(12) United States Patent
Sivasankar et al.

(10) Patent No.: US 9,660,901 B2
(45) Date of Patent: May 23, 2017

(54) SYSTEMS AND METHODS FOR FORMING AND USING A GROUP OF LINK AGGREGATION GROUPS TO REDUCE TRAFFIC ON INTERCONNECT LINKS

(71) Applicant: DELL PRODUCTS L.P., Round Rock, TX (US)

(72) Inventors: Ravikumar Sivasankar, Tamil Nadu (IN); Purushothaman Nandakumaran, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 13/677,226

(22) Filed: Nov. 14, 2012

(65) Prior Publication Data

US 2014/0133486 A1 May 15, 2014

(51) Int. Cl.
*H04L 12/56* (2006.01)
*H04L 12/709* (2013.01)
*H04L 12/891* (2013.01)
*H04L 12/931* (2013.01)

(52) U.S. Cl.
CPC ............ *H04L 45/245* (2013.01); *H04L 47/41* (2013.01); *H04L 49/70* (2013.01); *Y02B 60/33* (2013.01)

(58) Field of Classification Search
CPC ..... H04L 45/245; H04L 45/28; H04L 45/745; H04L 49/70; H04L 45/08; H04L 45/16; H04L 61/6022; H04L 12/4641; H04L 45/66; H04L 45/586; H04L 45/00; H04L 45/18; H04L 49/357; H04L 47/41; Y02B 60/33

USPC ....... 370/392, 228, 235, 401, 254, 419, 389, 370/216
See application file for complete search history.

(56) References Cited

U.S. PATENT DOCUMENTS

| | | | |
|---|---|---|---|
| 7,912,091 B1* | 3/2011 | Krishnan et al. | 370/490 |
| 8,467,395 B1* | 6/2013 | Wadekar et al. | 370/395.32 |
| 2007/0183313 A1* | 8/2007 | Narayanan | H04L 49/357 370/216 |
| 2007/0268915 A1* | 11/2007 | Zelig et al. | 370/401 |
| 2008/0240133 A1* | 10/2008 | Tanaka | H04L 45/245 370/401 |
| 2008/0285555 A1* | 11/2008 | Ogasahara | H04L 45/00 370/389 |
| 2010/0316055 A1* | 12/2010 | Belanger et al. | 370/396 |

(Continued)

*Primary Examiner* — Kwang B Yao
*Assistant Examiner* — Harun Chowdhury
(74) *Attorney, Agent, or Firm* — Haynes and Boone, LLP

(57) ABSTRACT

A first switch forms first and second LAGs and a main LAG comprising the first and second LAGs as sub-LAGs. Forming the first and second LAGs comprises receiving LACP data units which indicate that the first switch is connected to second and third switches through first and second pluralities of ports, and forming the first LAG of the first plurality of ports and the second LAG of the second plurality of ports. The second and third switches share a control plane. In forming the first and second LAGs, LACP data units are received from the second and third switches and include unique identifiers of the second and third switches respectively. Forming the main LAG comprises receiving one or more LACP data units which indicate that the first and second plurality of ports are to be part of the main LAG, and forming the main LAG based on such LACP data units. Other features are also provided.

10 Claims, 6 Drawing Sheets

(56) References Cited

U.S. PATENT DOCUMENTS

| | | | |
|---|---|---|---|
| 2010/0329147 A1* | 12/2010 | Nam et al. | 370/254 |
| 2011/0228767 A1* | 9/2011 | Singla et al. | 370/389 |
| 2011/0267950 A1* | 11/2011 | Solomon | 370/235 |
| 2012/0033665 A1* | 2/2012 | Jacob Da Silva | H04L 45/245 370/389 |
| 2012/0182866 A1* | 7/2012 | Vinayagam | H04L 45/245 370/228 |
| 2012/0236859 A1* | 9/2012 | Subramanian et al. | 370/392 |
| 2014/0036924 A1* | 2/2014 | Christenson | 370/395.53 |
| 2014/0198793 A1* | 7/2014 | Allu et al. | 370/392 |
| 2014/0254377 A1* | 9/2014 | Wakumoto | 370/235 |

\* cited by examiner

SYSTEMS AND METHODS FOR FORMING AND USING A GROUP OF LINK AGGREGATION GROUPS TO REDUCE TRAFFIC ON INTERCONNECT LINKS

BACKGROUND

1. Technical Field

The present disclosure is related to information handling systems. In particular, embodiments disclosed herein are related to traffic on interconnect links between layer-2 switches.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, information handling systems may take the form of a plurality of layer-2 switches connected together. Where one switch is connected to both of a pair of switches that are connected to each other in a stacking arrangement or by interconnect links such as in a virtual link trunking (VLT) configuration or a virtual switching system, traffic may unnecessarily flow over the stacking links or interconnect links. This consumes bandwidth between the pair of switches and increases the number of hops required to traverse a network. Thus, current information handling systems have not been completely satisfactory.

SUMMARY

Consistent with some embodiments, there is provided a method comprising a first switch performing operations of:

forming a first link aggregation group (LAG), forming a second LAG, and forming a main LAG comprising each port of the first and second LAGs, the first LAG being a first sub-LAG of the main LAG, the second LAG being a second sub- LAG of the main LAG;

maintaining, in a memory, association between destination media access control (MAC) addresses and those ports and/or LAGs on which packets with such destination MAC addresses are to be forwarded, such that a unicast MAC address is associable with any of the first and second sub-LAGs, to cause the first switch to forward packets such that if a packet is received on a port that is not part of the main LAG, then:

if the packet's destination MAC address is a unicast address associated with the first sub-LAG in the memory, then the packet is forwarded over the first sub- LAG;

if the packet's destination MAC address is a unicast address associated with the second sub-LAG in the memory, then the packet is forwarded over the second sub-LAG; and if the packet is a flooding packet and/or the packet's destination MAC address is not associated with any port or LAG in the memory, then the packet is forwarded over the main LAG;

wherein forming the first and second LAGs comprises receiving a plurality of link aggregation control protocol (LACP) data units at the first switch, the LACP data units indicating that the first switch is connected to a second switch through a first plurality of ports and a third switch through a second plurality of ports, and forming the first sub-LAG of the first plurality of ports and a second sub-LAG of the second plurality of ports;

wherein the second and third switches share a control plane;

wherein in forming the first and second LAGs, the LACP data units are received at the first switch from the second and third switches, with:

LACP data units from the second switch including a type-length-value (TLV) element that has a unique identifier of the second switch as a value of the TLV element; and LACP data units from the third switch including a TLV element that has a unique identifier of the third switch as a value of the TLV element;

wherein forming the main LAG comprises receiving one or more LACP data units at the first switch which indicate to the first switch that the first and second plurality of ports are to be part of the main LAG, and forming the main LAG based on such one or more LACP data units.

Consistent with some embodiments, there is provided an information handling system. The information handling system includes a first switch that has a computer processor in communication with a plurality of ports for receiving and sending packets and a memory including a look-up table. The look-up table associates at least some of the plurality of ports with a group of link aggregation groups (LAGs) such that an incoming packet is received by the first switch as belonging to a first LAG of the group of LAGs and an outgoing packet is sent out from the first switch as belonging to either the first LAG or a second LAG of the group of LAGs depending on a type of the outgoing packet.

Consistent with some embodiments, there is further provided a method for forming and using a group of LAGs to reduce traffic on interconnect links. The method includes the steps of identifying a plurality of ports on a switch associated with a first sub-LAG, a plurality of ports on the switch associated with a second sub-LAG, both pluralities of ports also being associated with a main LAG, and receiving a packet on a first port of the plurality of ports associated with the first sub-LAG. The packet having a source media access control (MAC) address and a destination MAC address. The method further includes associating the source MAC address with the first sub-LAG in a look-up table and sending the packet to a port on the switch, the port being coupled to a host identified by the destination MAC address.

Consistent with some embodiments, there if further provided a method for forming and using a group of LAGs to reduce traffic on interconnect links. The method includes the steps of receiving a packet from a host connected to a first switch, the first switch being configured to support a first sub-LAG, a second sub-LAG, and a main LAG, and determining whether a look-up table of the first switch has an entry for a destination MAC address of the packet. The method includes a step of performing a look-up in a look-up table to determine if the destination MAC address is associated with either the first or the second sub-LAG and then sending the packet on a member port of either the first or second sub-LAG as determined. Finally the method includes a step of sending the packet on a member port of a main LAG, if the packet does not have a destination MAC address. The main LAG has a plurality of member ports that includes all member ports of the sub-LAG and all member ports of another sub-LAG.

These and other embodiments will be described in further detail below with respect to the following figures.

Figure 1:
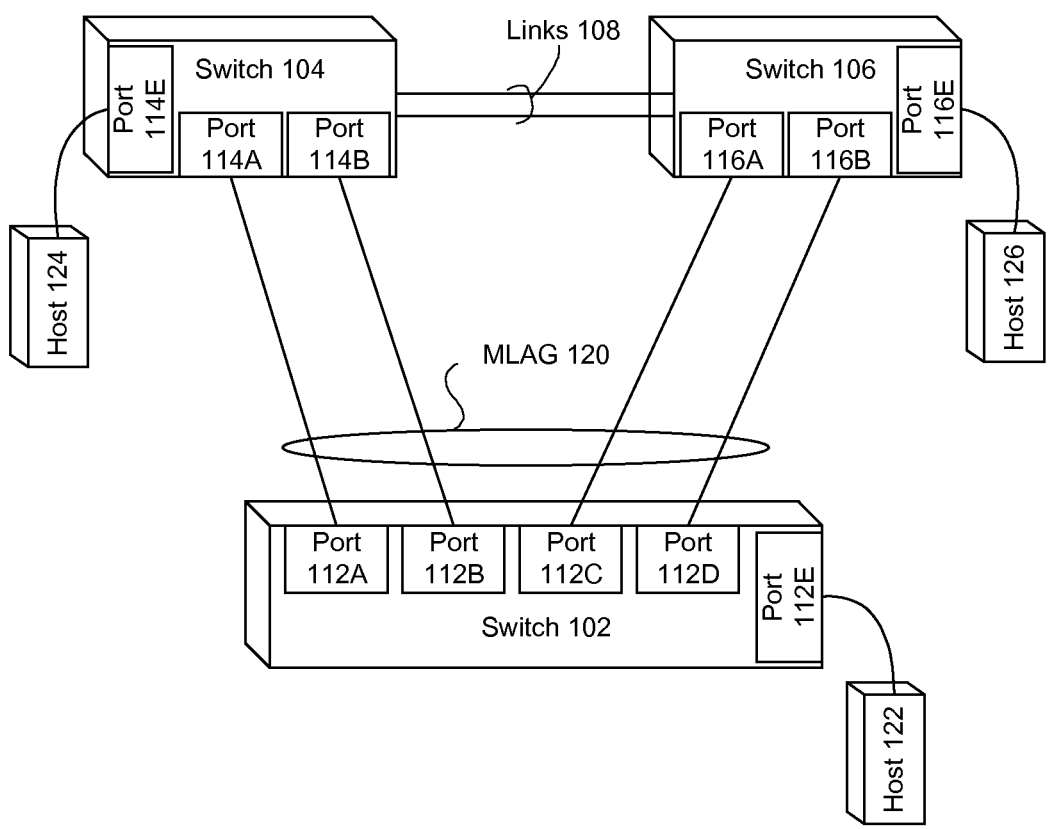
FIG. 1 is a diagram of an information handling system that includes a pair of switches both connected to another switch by a multi-chassis link aggregation group (MLAG).

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 depicts an information handling system 100 that includes a switch 102 that is connected to a pair of switches 104 and 106. Each of switches 102, 104, and 106 includes a plurality of ports. As depicted, switch 102 has five ports (labeled as ports 112A-E), while switches 104 and 106 each include three ports (labeled as 114A, 114B, and 114E, and as 116A, 116B, and 116E, respectively). Each of switches 102, 104, and 106 may have a plurality of hosts, such as servers, connected thereto. As depicted, switch 102 is connected to a host 122 by switch 102's port 112E, switch 104 is connected to a host 124 by its port 114E, and switch 106 is connected by its port 116E to a host 126. In one embodiment, switches 104 and 106 are connected together in a stacking arrangement by links 108. In another embodiment, links 108 are interconnect links used in a virtual link or line trunking (VLT) configuration. Links 108 are provided between appropriate ports (not depicted) on switches 104 and 106.

In such embodiments, switches 104 and 106 act in some respects as a single switch, using links 108 in a stacking configuration, VLT, or virtual switching system (VSS) to move packets between them as necessary. In a VLT configuration, both switch 104 and 106 are active and running separate control planes, while in a VSS switch 104 and 106 may use only a single active control plane for both switches.

For example, host 122 sends a packet having the media access control (MAC) address of host 124 as its destination MAC address. The packet is first sent from host 122 to switch 102 through port 112E. A module on switch 102 may determine from the packet's destination MAC address that the packet should be hashed on multi-chassis link aggregation group (MLAG) 120, which includes ports 112A, 112B, 112C, and 112D as member ports. Based on the hashing algorithm used by switch 102, the packet may be sent to any of MLAG 120's member ports. In this example, the hashing algorithm determines that the packet should be sent over port 112C to port 116A on switch 106.

Switch 106 may be configured by MAC learning to know that host 124 is not attached to switch 106, but to switch 104. Switch 106 then transmits the packet over links 108. Switch 104 then sends the packet to host 124 through port 114E. The way the packet was handled, being hashed to a port connected to switch 106 rather than a port to switch 104, contributed to traffic on links 108 and also required an extra hop: a first hop from switch 102 to switch 106, and a second from switch 106 to switch 104. In some instances, the packet being hashed on the member ports of MLAG 120 may be sent directly to switch 104. But, while switch 102 is unaware that switches 104 and 106 are unique, separate switches, many packets intended for either host 124 or host 126 from host 122 may be subject to the extra hop and also contribute to unnecessary traffic over links 108.

Figure 2:
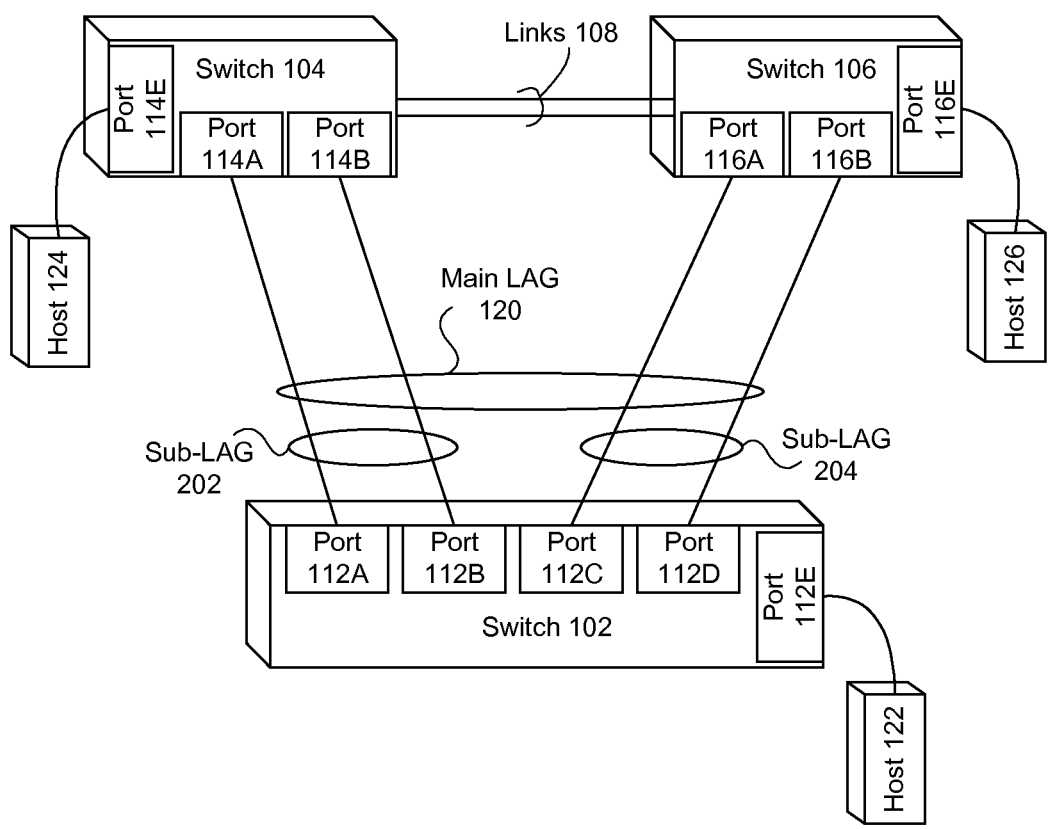
FIG. 2 is a diagram of an information handling system that includes a pair of switches both connected to another switch by a multi-chassis link aggregation group (MLAG) and two sub-LAGs according to an embodiment.

FIG. 2 is a diagram of an information handling system 200 that is similar in many respects to information handling system 100 of FIG. 1. Thus, information handling system 200 includes switches 102, 104, and 106, each having ports as described with respect to information handling system 100. Further, each of switches 102, 104, and 106 is connected to a host 122, 124, and 126, respectively.

In addition to an MLAG 120 that includes ports 112A, 112B, 112C, and 112D as member ports, a look-up table on switch 102 also supports additional LAGs that include ports 112A, 112B, 112C, and 112D as members as well. Thus, switch 102 supports a sub-LAG 202 that includes ports 112A and 112B as member ports and a sub-LAG 204 that includes ports 112C and 112D as its member ports. Sub-LAGS 202 and 204 and MLAG 120 form a group of LAGs referred to herein as a repellent LAG group. MLAG 120 is also referred to as a main LAG 120 in this context.

The depicted embodiment of information handling system 200 includes only two switches coupled to switch 102. Other embodiments may include more switches coupled to switch 102. Such embodiments of information handling system 200 may also include more than two sub-LAGs that share the member ports of a main LAG. Thus, one embodiment may include three stacked switches connected to switch 102, with a sub-LAG connecting each of the three stacked switches to switch 102, and a main LAG 120 that includes all the member ports of the three sub-LAGs.

In information handling system 200, when host 122 needs to send a unicast packet to host 124, switch 102 may utilize the repellent LAG group in the following exemplary manner. The packet is sent by host 122 to switch 102 through port 112E. Switch 102 determines the destination MAC address of the packet and uses that destination MAC address to perform a look-up in a look-up table to determine how the packet should be sent. The look-up table includes an association between the destination MAC address (the MAC address of host 124) with sub-LAG 202. Switch 102 uses a hashing algorithm to determine which of sub-LAG 202's member ports should be used to send the packet. In this example, the hashing algorithm determines that the packet is to be sent on port 112B to port 114B on switch 104. Once at switch 104, switch 104 recognizes the destination MAC address of the packet as the MAC address of host 124, and sends the packet through port 114E to host 124.

In the preceding example, the look-up determined that sub-LAG 202 was to be used for transmission of the packet, not sub-LAG 204 or main LAG 120, because the look-up table contains the association between host 124's MAC address and sub-LAG 202, not sub-LAG 204 or main LAG 120. This may avoid the extra hop and unnecessary traffic on links 108 as described in connected with information handling system 100 of FIG. 1.

As another example illustrating the operation of the repellent LAG group, host 122 may send a flooding packet. The packet is sent from host 122 to switch 102 through port 112E. Since the look-up table does not provide information on where the destination MAC address of the packet resides, a look-up performed on the look-up table does not indicate the packet is to be sent on sub-LAG 202 or on sub-LAG 204. In such an instance, main LAG 120 is used instead. A hashing algorithm determines which one of main LAG 120's member ports to use. In this example, port 112A is selected. The packet is sent through port 112A to switch 104 which floods the packet to host 124 and sends the packet across links 108 to switch 106 which floods the packet to host 126. Switch 106 does not flood the packet on ports 116A or 116B, as this would loop the packet back to switch 102, but only to 116E.

In general, any traffic received on ports 112A and 112B may be treated as being received on sub-LAG 202, and traffic received on ports 112C or 112D may be treated as being received on sub-LAG 204. Traffic received on ports 112A, 112B, 112C, and 112D is not treated as being received on main LAG 120. But port properties of main LAG 120, such as the default virtual local area network (VLAN) identifier, may be applied to sub-LAGs 202 and 204. Traffic received on sub-LAG 202 is not sent on sub-LAG 204. Likewise traffic received on sub-LAG 204 is not sent on sub-LAG 202. Flooding traffic received on ports other than those belonging to the repellent LAG group (in information handling system 200 ports 112A, 112B, 112C, and 112D belong to the repellent LAG group), such as port 112E, is hashed and sent on main LAG 120, not on the sub-LAGs. Thus, the main LAG 120 is used as a flooding/multicast group while the sub-LAGs are not, so such packets are hashed and sent on one of the member ports of main LAG 120.

The repellent LAG group may be formed by a user manually configuring the repellent LAG group on switch 102. Alternatively, the repellent LAG group is formed by operation of the link aggregation control protocol (LACP) among switches 102, 104, and 106. When connected, switches 102, 104, and 106 exchange protocol data units (PDUs) associated with the LACP. These PDUs may contain a variety of type-length-value (TLV) elements that allow optional information to be transmitted along with the PDUs. To form a repellent LAG group, the switches 102, 104, and 106 are configured or programmed so that their PDUs contain a TLV of a port local attachment information type. These port local attachment information TLVs may each contain a port switch identification number (PSIN), a unique number associated with the switch that sends the PDU. The PSIN may be a hardware or system identifier for the switch.

For example, switch 104 sends out an LACP data unit that includes the port local attachment information TLV with a unique port switch identification number for switch 104. When switch 102 receives this LACP data unit on either port 112A or 112B, switch 102 extracts the TLV along with the port switch identification number contained therein. Using this information and the knowledge of which port it was received on, 112A or 112B, switch 102 becomes aware that the receiving port is connected to a specific switch, switch 104. Through the exchange of these LACP data units containing the local port attachment information TLV, switch 102 learns that port 112A and port 112B are connected to switch 104 and that ports 112C and 112D are connected to switch 106. The LACP protocol may cause the formation of sub-LAGs 202 and 204 using this information and the local port attachment information TLVs after the creation of the main LAG 120 by normal operation of the LACP protocol or by manual configuration.

In some embodiments, such as one in which links 108 are stacking links, the LACP data units for both switch 104 and switch 106 may be generated by only one of those switches. Thus, if switch 106 and switch 104 are in a stacking relationship, and switch 104 is designated as the master for the stack, switch 104 may generate its own LACP data units and LACP data units on behalf of the switch 106. In such embodiments, switch 104 generates LACP data units for switch 106 and then sends them to switch 106 over links 108. Switch 106 then sends the LACP data units out through its ports 116A and 116B. In such an instance, rather than include a PSIN, the TLV in the LACP data units may contain a unique slot identifier assigned to each unit in the stack. In this way, even in situations in which a control plane is shared by multiple switches, sub-LAGs can be organized by the operation of the LACP.

After switch 102 is made aware that it is connected to both switch 104 and switch 106, MAC learning can be used to generate a look-up table that associates MAC addresses with either sub-LAG 202 or sub-LAG 204. For example, host 124 sends a flooding packet to switch 104 through port 114E. When the flooding packet is sent from switch 104 to either port 112A or 112B, those ports are already recognized by switch 102 as connected to switch 104, so the packet is received on sub-LAG 202. Now switch 102 learns the MAC address of host 124 from the source MAC address of the flooding packet. This association among the MAC address, the sub-LAG identifier, and the receiving port is recorded in a look-up table on switch 102. Switch 102 then floods the packet on all ports that are not members of the repellent LAG group, which in this case means port 112E. In embodiment where other hosts (not depicted) are coupled to switch 102, those hosts would receive the packet too.

If host 122 responds to the received packet by sending a unicast packet back to host 124, using the MAC address of host 124 as the destination MAC address of the packet, switch 102 may have learned the MAC address through MAC learning. Therefore, by performing a look-up in a look-up table, switch 102 may determine that the packet should be hashed on sub-LAG 202. The packet may be hashed to any of the member ports of sub-LAG 202. In the depicted embodiment this means it will be hashed to either port 112A or 112B. Thus the packet may not be sent to switch 106 from which an additional hop over links 108 would be required to transmit the packet to host 124.

As an additional example, supposing that switch 102 is unaware of host 126 and needed to communicate with it, host 122 may send a flooding packet to switch 102 in order to reach host 126. Since the packet is a flooding packet, a look-up of the look-up table (if performed), may indicate that the packet should be flooded on main LAG 120. Switch 102 may then hash the packet on main LAG 120. This may send the packet directly to switch 106 or indirectly to switch 106 by way of switch 104 and links 108. From switch 106 the packet is delivered to host 126. If host 126 responds by sending a packet back to host 122, the MAC address of host 126 will be learned from the packet's source MAC address when it is received on sub-LAG 204. An association between host 126's MAC address and sub-LAG 204 is recorded in switch 102's look-up table, so that the next time a packet is sent to host 126, switch 102 will recognize the MAC address and know to send the packet out on sub-LAG 204.

Figure 3:
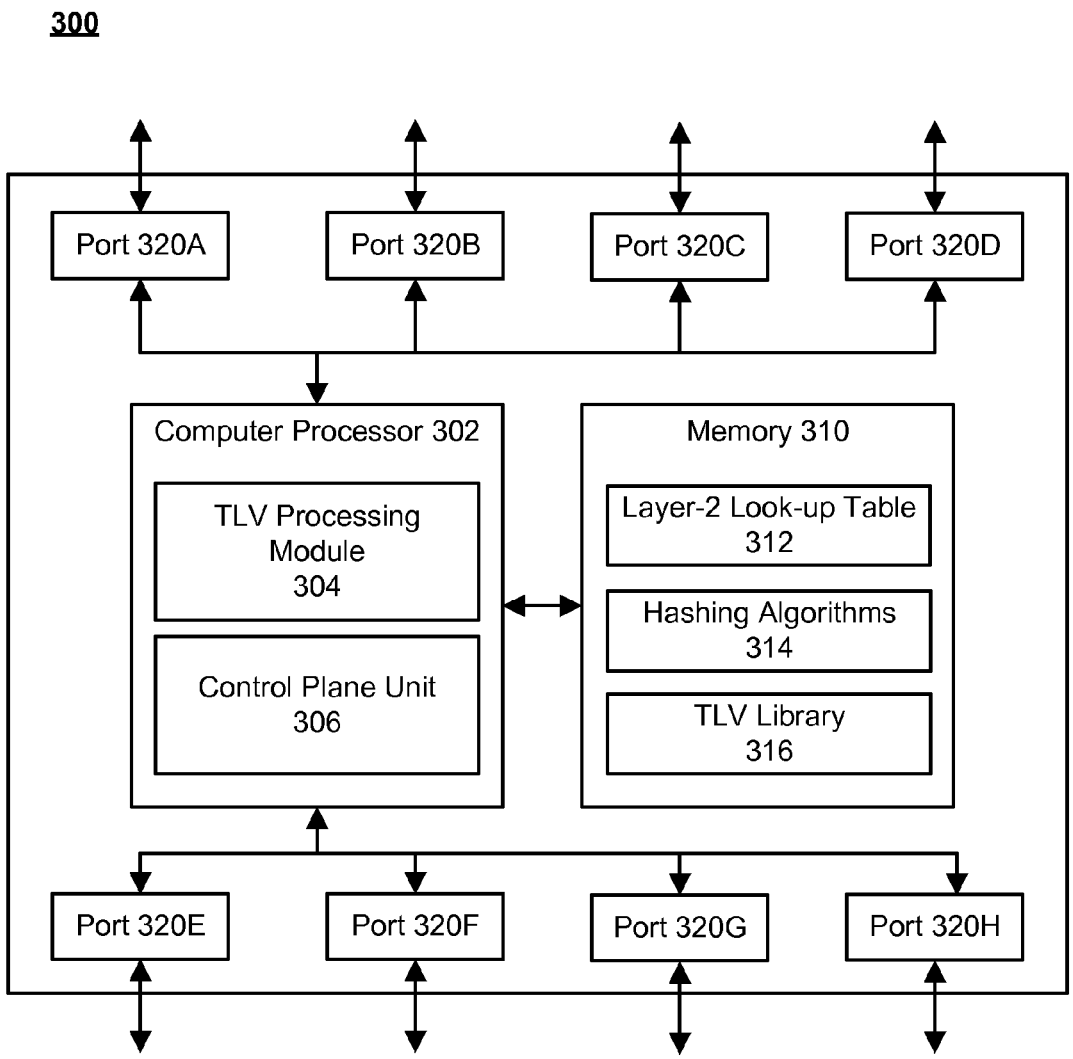
FIG. 3 is a functional diagram of an information handling device configured to support a main MLAG and a plurality of sub-LAGs according to an embodiment.

FIG. 3 is a diagram of an information handling device 300, or a switch 300, such as may be used for switches 102, 104, and 106 in information handling system 200 of FIG. 2. Switch 300 includes a computer processor 302 in communication with a memory 310 and a plurality of ports 320A-H. While depicted as a single processor in FIG. 3, computer processor 302 may be a plurality of computer processors functioning together to provide various capabilities and features. In the depicted embodiment, computer processor 302 provides a TLV processing module 304 and a control plane unit 306. When an LACP data unit is received on one of ports 320A-H, the packet is processed by computer processor 302's TLV processing module 304. LACP data units may be used to form a repellent LAG group, which may include ports 320A and 320B in a first sub-LAG and 320C and 320D in a second sub-LAG with both sub-LAGs being part of a main LAG.

Any TLVs and any information included therein in the LACP data unit may be extracted by the TLV processing module 304. For example, as described above in connection with information handling system 200, an LACP data unit may include a TLV that indicates the sender of the LACP data unit, a port local attachment information TLV that include a port switch identification number. When the TLV processing module 304 processes the TLV, it may extract the port switch identification number and store it, in connection with the port on which the LACP data unit was received, in one or more look-tables including a layer-2 look-up table 312. In addition to the TLV processing module 304, switch 300 includes a TLV library 316 that has a plurality of TLVs that can be included in LACP data units sent by switch 300 to any switches connected to ports 320A-H. For example, computer processor 302 may copy a port local attachment information TLV and include a unique identifier for switch 300 as the value of the TLV before sending it to connected switches.

When sending a data packet received on switch 300 from an attached host (not depicted), computer processor 302 performs a look-up in layer-2 look-up table 312 stored in memory 310. The packet's destination MAC address may be used to determine, by performing the look-up, that the packet should be hashed on the first sub-LAG. Computer processor may select from a plurality of hashing algorithms 314 stored in memory 310 to hash the packet to either port 320A or 320B, the member ports of the first sub-LAG. Thus, switch 300 may be configured to both provide and use a repellent LAG group in order to decrease traffic between attached stacked switches and decrease the hops required for many unicast packets.

Figure 4:
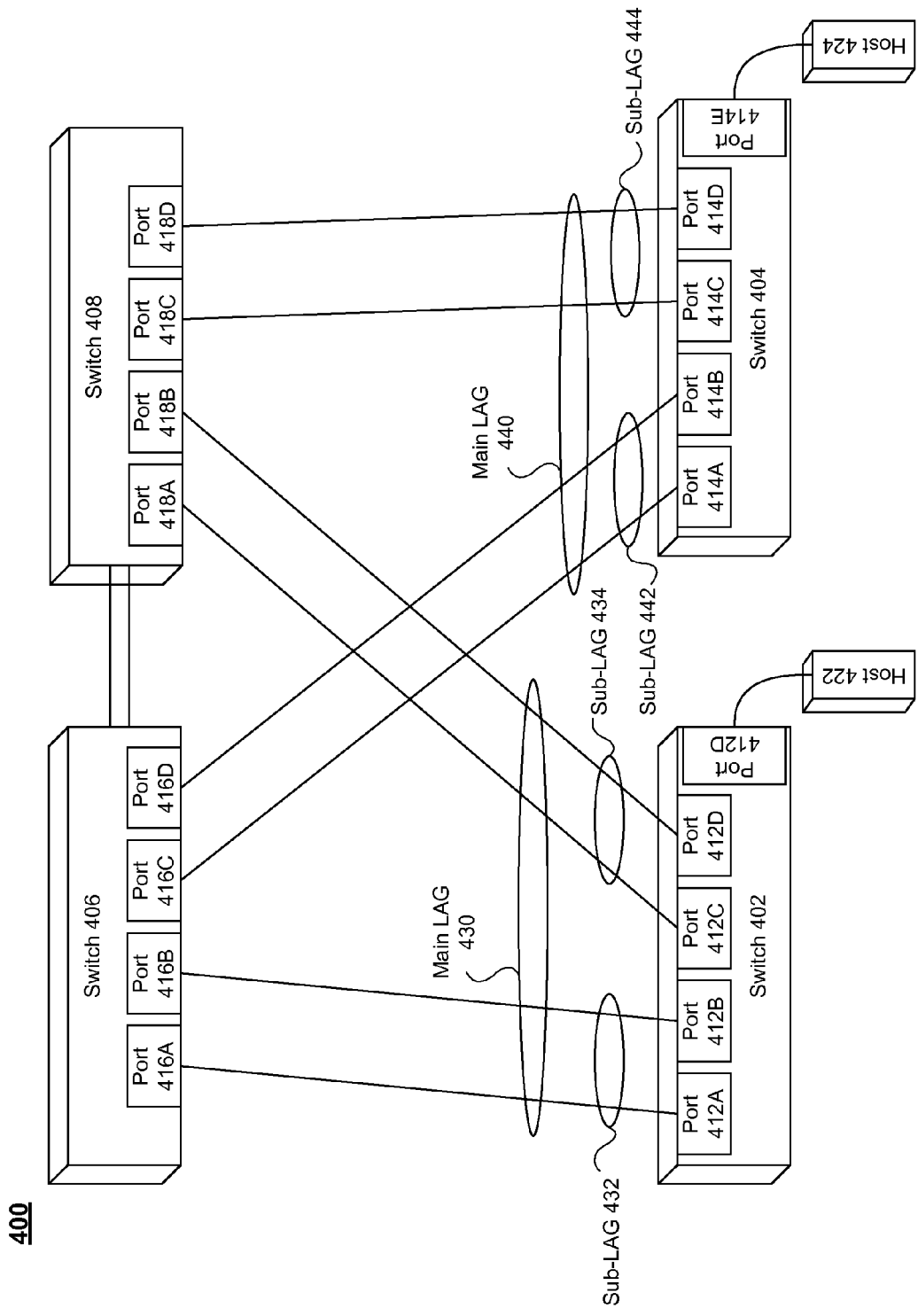
FIG. 4 is a diagram of an information handling system that includes a pair of stacked switches connected to a pair of unstacked switches according to an embodiment.

FIG. 4 includes an information handling system 400, which in many respects is similar to information handling system 200 of FIG. 2, and may employ switches similar to switch 300 of FIG. 3. Information handling system 400 includes switches 402, 404, 406, and 408. In some embodiments, switches 406 and 408 are in a stacked configuration, VLT peers, or part of a virtual switching system (VSS).

Information handling system 400 is configured, either manually or through operation of LACP with the disclosed TLVs, to include two repellent LAG groups between switches 402 and 404 and switches 406 and 408. A first repellent LAG group includes a main LAG 430, a sub-LAG 432, and a sub-LAG 434. Sub-LAG 432 is depicted as including ports 412A and 412B, while sub-LAG 424 includes ports 412C and 412D. Main LAG 430 includes all of the ports of both sub-LAGS, which in this case is ports 412A-D. Similarly, a second repellent LAG group includes a main LAG 440 that has a sub-LAG 442, with ports 414A and 414B, and a sub-LAG 444 with ports 414C and 414D.

Assuming that switches 402, 404, 406, and 408 are part of a single broadcast domain, traffic from a host 422 connected to switch 402 may communicate with a plurality of hosts connected to switch 404 (of which only host 424 is depicted). As a result of the depicted configuration, a packet from host 422 may be hashed on either sub-LAG 432 or sub-LAG 434, so any of ports 412A-D. If hashed on sub-LAG 432 the packet is sent to switch 406, and then to either port 414A or 414B on switch 404. If hashed on sub-LAG 434 the packet is sent to switch 408, and then to either port 414C or 414D of switch 404. Thus, a packet from host 422, having a particular MAC address, may be received by switch 404 on either sub-LAG 442 or sub-LAG 444. This may cause continuous MAC moves in the look-up table on switch 404, as the MAC address is associated with sub-LAG 442 and then with sub-LAG 444 and sent out accordingly.

Like switch 300 of FIG. 3, switches 402 and 404 both have a library of hashing algorithms. Included among the library of hashing algorithms is a hashing algorithm based solely on the source MAC address of a packet. By using the source MAC address of a packet, packets having the particular source MAC address (such as packets from host 422) may all be directed on main LAG 430 to either switch 406 or switch 408, but not to both switches 406 and 408. Therefore, a packet sent from host 422 to host 424 may arrive consistently on either sub-LAG 442 or sub-LAG 444, allowing normal MAC learning to be stable and useful as described in connection with FIGS. 2 and 3.

For example, switch 402 may use a hashing algorithm based on the source MAC address of a packet sent from host 422 that is sent to host 424. For packets having the source MAC address the hashing algorithm, in this example, sends the packet to port 412C consistently. Therefore, the packet is sent to switch 408 consistently, and so arrives on switch 404 on either port 414C or 414D, which are both member ports of sub-LAG 444. Switch 404 may then send the packet to its destination, host 424. Switch 404 may use MAC learning as normal without continuous MAC moves being recorded in its look-up table.

As an additional example, an additional host (not depicted) coupled to switch 402 having another MAC address may send a packet to host 424. Based on the source MAC address of the packet, switch 402 may consistently send the packet out on port 412A by using the source MAC based hashing algorithm. Therefore, packets from the additional host may consistently arrive at switch 404 on sub-LAG 442, and MAC learning may be used to associate the MAC address of the additional host with sub-LAG 442.

In yet another example of information handling system 400, switches 402 and 404 are top-of-rack switches (TORs), with switch 402 being part of a first VLAN and switch 404 being part of a second VLAN. Switches 402 and 404 may be part of different subnets, and switches 406 and 408 are used to route traffic between them. Because the traffic is routed, switches 406 and 408 may replace the source MAC address of the packets in the routing process with an interface MAC address. The interface MAC address used may be the same for both switch 406 and switch 408, because they are stacked or in a VSS. This may generate a situation in which unicast packets from host 422 are received on switch 404 on sub-LAG 442 sometimes and on sub-LAG 444 at other times. Thus, the ordinary MAC learning used for sending packets out on the appropriate sub-LAG may not function properly.

To alleviate this problem, switches 406 and 408 can be programmed with instructions in memory such that their computer processors use different, assigned MAC addresses rather than a common interface MAC address when routing packets to switches 402 or 404. Thus, when switch 402 properly hashes a packet as described above; the packet arrives on switch 404 having a source MAC address indicative of being sent through either switch 406 or switch 408. Thus, MAC learning can be handled as normal by switch 404, allowing switch 404 to then send out packets to host 422 using sub-LAGs as taught herein.

Figure 5:
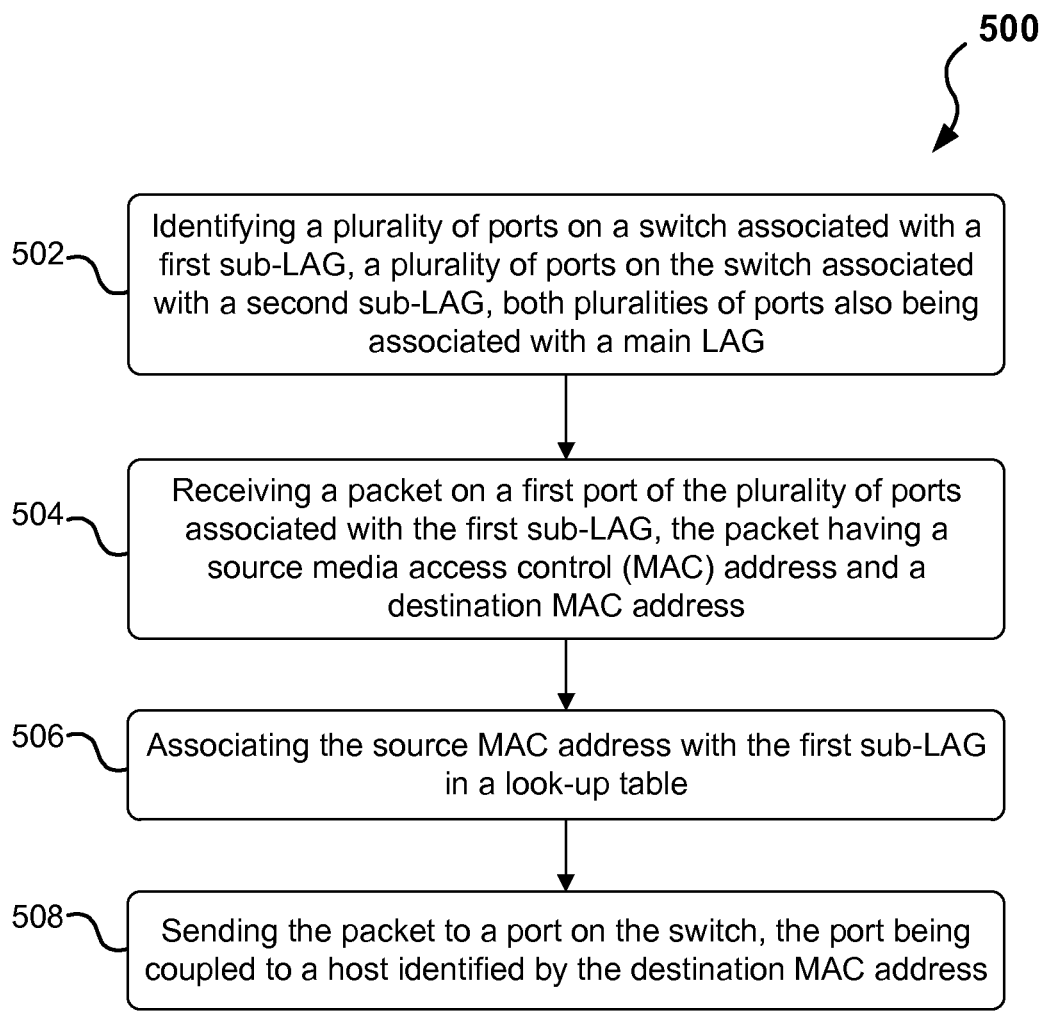
FIG. 5 is a flowchart of a method for forming and using LAG groups to decrease traffic over interconnect links in a network according to an embodiment.

FIG. 5 is a flowchart of a method 500 for forming and using repellent LAG groups to reduce traffic on interconnect links. Method 500 may include a number steps, beginning with a step 502 in which a computer processor on a switch identifies a plurality of ports on the switch associated with a first sub-LAG, a plurality of ports on the switch associated with a second sub-LAG. Both pluralities of ports are also associated with a main LAG. In step 504, the switch receives a packet on a first port of the plurality of ports associated with the first sub-LAG. The packet has a source MAC address and a destination MAC address. The switch associates the source MAC address with the first sub-LAG in a look-up table in step 506, and then sends the packet to a port on the switch that is coupled to a host identified by the destination MAC address, in step 508.

In operation, it may be useful to note how method 500 may be carried out by a switch like switch 300 of FIG. 3 in an information handling system like information handling system 200 of FIG. 2. As discussed above, LACP data units may be received by computer processor 302. These LACP data units are sent by switches like 300 that insert a TLV, from a TLV library 316, that includes an identifier of the sending switch, so that the receiving switch can use a TLV processing module 304 to determine the identity of the switch that sent the LACP data unit. Through the operation of LACP, computer processor 302 may group ports on switch 102 connected to switches 104 and 106 into sub-LAGs. In FIG. 2, information handling system 200 depicts a switch 102 with a sub-LAG 202 formed by ports 112A and 112B connected to switch 104 and a sub-LAG 204 formed by ports 112A and 112B connected to switch 106. Computer processor 302 may further create a main LAG 120 that includes all ports of sub-LAGs 202 and 204. This all may be accomplished as part of step 502.

In step 504, switch 102 may receive a packet from host 124 on port 112A, which is a member port of sub-LAG 202. This packet may include the MAC address of host 124 as its source MAC address and the MAC address of host 122 as its destination MAC address. In step 506, switch 102 associates the source MAC address in the packet with sub-LAG 202 in a look-up table 312. Because of this recorded association, when a packet is sent from switch 102 to host 124, a look-up of the table may indicate that the packet should be hashed on sub-LAG 202. In step 508, switch 102 sends the packet on to host 124 in accord with the destination MAC address of the packet.

Figure 6:
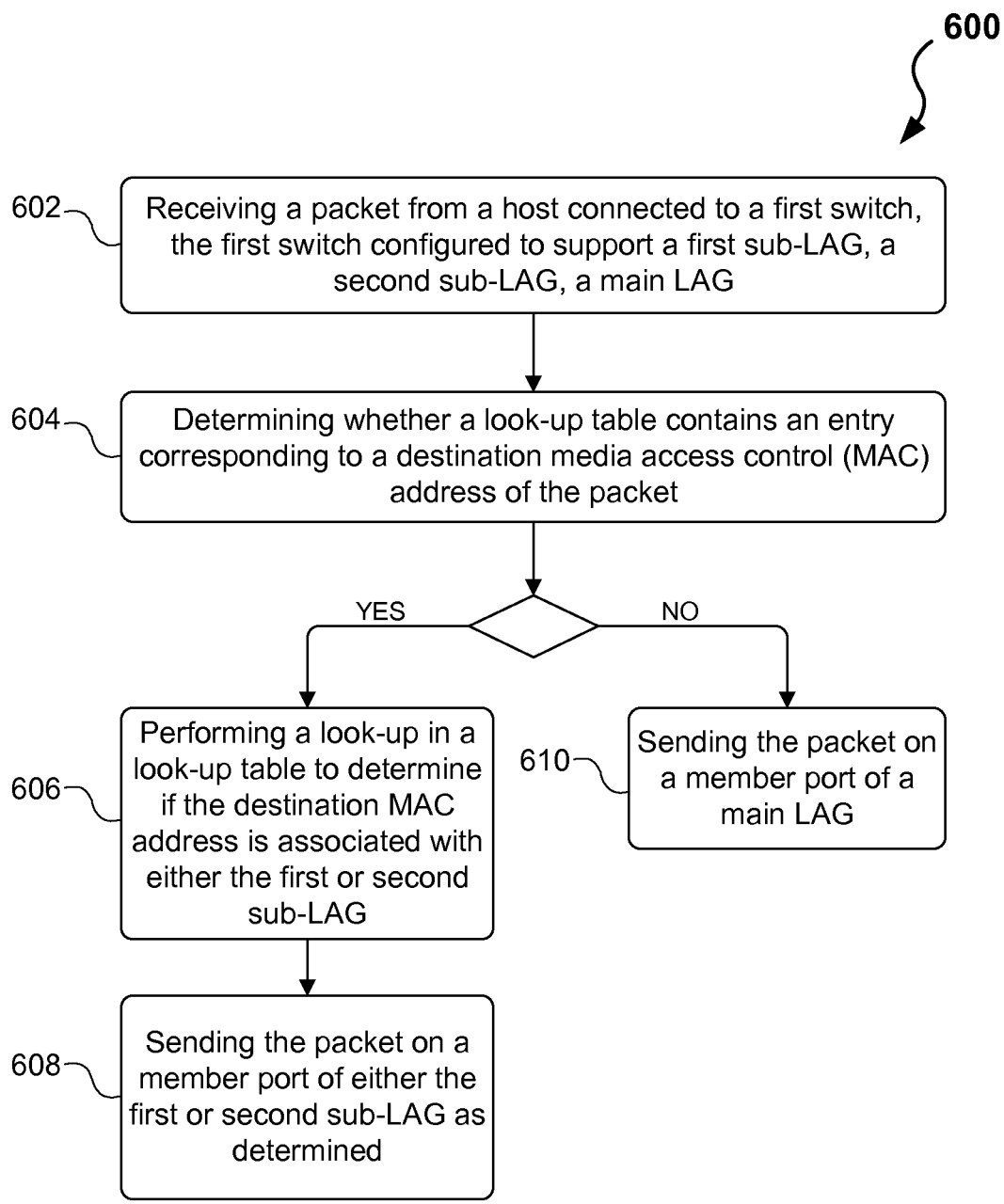
FIG. 6 is a flowchart of another method for forming and using LAG groups to decrease traffic over interconnect links in a network according to an embodiment.

FIG. 6 is a flowchart of a method 600 for forming and using a group of LAGs to reduce traffic on interconnect links. Method 600 includes a number of steps that allow for properly using the repellent LAG group when sending a packet from the switch supporting the repellent LAG group. Method 600's steps include a step 602, in which a first switch receives a packet from a host connected to it. The first switch is configured to support a first sub-LAG, a second sub-LAG, and a main LAG. In step 604, the first switch determines whether the packet has a destination MAC address corresponding to an entry in a look-up table. In steps 606 and 608, if the packet does have a destination MAC address, the switch performs a look-up in a look-up table to determine if the destination MAC address is associated with either the first or the second sub-LAG and then sends the packet on a member port of either the first or second sub-LAG as determined. If the packet does not have a destination MAC address, the first switch sends the packet on a member port of a main LAG, in step 610. The main LAG has a plurality of member ports that includes all member ports of the sub-LAG and all member ports of another sub-LAG.

Switch 300 of FIG. 3 and information handling system 200 of FIG. 2 may be helpful in providing an example of how method 600 may be performed. In step 602, switch 102 may receive a packet from host 122. Switch 102 supports a sub-LAG 202 that includes ports 112A and 112B as members ports, a sub-LAG 204 that includes ports 112C and 112D, and a main LAG that includes ports 112A-D as member ports. Identifiers of sub-LAGs 202 and 204 appear in a look-up table 312 associated with a number of MAC addresses of hosts connected to switches 102, 104, and 106. The main LAG 120 may be associated with an flooding/multicast group.

In step 604, a computer processor 302 of switch 102 may determine whether the packet includes a destination MAC address. If the packet does, then in step 606, switch 102 performs a look-up in a look-up table 312 to determine if the destination MAC address has been associated with either sub-LAG 202 or sub-LAG 204. If the look-up determines that the destination MAC address is associated with sub-LAG 202, then the packet is hashed on sub-LAG 202 and sent out on one of its member ports in step 608. Switch 102 acts analogously if the look-up determines that the packet should be hashed on sub-LAG 204. If the packet does not have a destination MAC address, or the destination MAC address is not yet known to switch 102, the packet may be hashed on main LAG 120 and sent out on one of its member ports.

Some embodiments of information handling systems 200 and 400 include non-transient, tangible, machine-readable media that includes executable code that when run by a processor, such as computer processor 302 of switch 300 in FIG. 3, may cause the processor to perform the steps of method 500 or 600 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 310 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method comprising a first switch performing operations of:
   forming a first link aggregation group (LAG), forming a second LAG, and forming a main LAG comprising each port of the first and second LAGs, the first LAG being a first sub-LAG of the main LAG, the second LAG being a second sub-LAG of the main LAG;
   maintaining, in a memory, association between destination media access control (MAC) addresses and those ports and/or LAGs on which packets with such destination MAC addresses are to be forwarded, such that a unicast MAC address is associable with any of the first and second sub-LAGs, to cause the first switch to forward packets such that if a packet is received on a port that is not part of the main LAG, then:
   if the packet's destination MAC address is a unicast address associated with the first sub-LAG in the memory, then the packet is forwarded over the first sub-LAG;
   if the packet's destination MAC address is a unicast address associated with the second sub-LAG in the memory, then the packet is forwarded over the second sub-LAG; and
   if the packet is a flooding packet and/or the packet's destination MAC address is not associated with any port or LAG in the memory, then the packet is forwarded over the main LAG;
   wherein forming the first and second LAGs comprises receiving a plurality of link aggregation control protocol (LACP) data units at the first switch, the LACP data units indicating that the first switch is connected to a second switch through a first plurality of ports and a third switch through a second plurality of ports, and forming the first sub-LAG of the first plurality of ports and the second sub-LAG of the second plurality of ports;
   wherein the second and third switches share a control plane;
   wherein in forming the first and second LAGs, the LACP data units are received at the first switch from the second and third switches, with:
   LACP data units from the second switch including a type-length-value (TLV) element that has a unique identifier of the second switch as a value of the TLV element; and
   LACP data units from the third switch including a TLV element that has a unique identifier of the third switch as a value of the TLV element;
   wherein forming the main LAG comprises receiving one or more LACP data units at the first switch which indicate to the first switch that the first and second plurality of ports are to be part of the main LAG, and forming the main LAG based on such one or more LACP data units.

2. The method of claim 1 wherein the second switch is a master switch generating LACP data units for the second and third switches, and sending to the third switch, over one or more links each of which is connected to the second and third switches, the LACP data units generated for the third switch, the third switch sending to the first switch the LACP data units received from the second switch.

3. The method of claim 1 wherein the second and third switches are in a stacking relationship.

4. An information handling system comprising:
   a first switch that includes:
   a computer processor in communication with a plurality of ports for receiving and sending packets; and
   a memory in communication with the computer processor;
   wherein the first switch is configured to use the computer processor, the memory, and the ports to:
   (1) recognize those of the ports that are assignable to link aggregation groups (LAGs) and to form at least a first LAG comprising a first group of said ports, a second LAG comprising a second group of said ports, the first and second groups being disjoint from each other, and a main LAG which comprises the first and second groups of said ports, the first LAG being a first sub-LAG of the main LAG, the second LAG being a second sub-LAG of the main LAG; and
   (2) maintain a look-up table in said memory which associates media access control (MAC) addresses with ports and/or LAGs, such that a unicast MAC address is associable with any of the first and second sub-LAGs, to cause the first switch to forward packets based on the packets' destination MAC addresses such that if a packet is received on a port that is not part of the main LAG, then:
   if the packet's destination MAC address is a unicast address associated with the first sub-LAG by the look-up table, then the packet is forwarded over the first sub-LAG;
   if the packet's destination MAC address is a unicast address associated with the second sub-LAG by the look-up table, then the packet is forwarded over the second sub-LAG; and
   if the packet is a flooding packet and/or the packet's destination MAC address is not associated with any port or LAG by the look-up table, then the packet is forwarded over the main LAG;

wherein the first switch is configured to form the first and second sub-LAGs and the main LAG when links forming the first sub-LAG are coupled to a second switch and links forming the second sub-LAG are coupled to a third switch, wherein the second and third switches share a control plane;

wherein forming the first and second sub-LAGs comprises receiving a plurality of link aggregation control protocol (LACP) data units at the first switch, the LACP data units indicating that the first switch is connected to the second switch through a first plurality of ports and the third switch through a second plurality of ports such that in forming the first and second sub-LAGs, the LACP data units are received at the first switch from the second and third switches, with:

LACP data units from the second switch including a type-length-value (TLV) element that has a unique identifier of the second switch as a value of the TLV element; and LACP data units from the third switch including a TLV element that has a unique identifier of the third switch as a value of the TLV element;

wherein forming the main LAG comprises receiving one or more LACP data units at the first switch which indicate to the first switch that the first and second plurality of ports are to be part of the main LAG, and forming the main LAG based on such one or more LACP data units.

5. The information handling system of claim 4, wherein a packet with a destination media address control (MAC) address is sent by the first switch over the second sub-LAG to the third switch if the destination MAC address is associated with the second sub-LAG in the look-up table.

6. The information handling system of claim 4, wherein a packet with a destination MAC address is sent by the first switch over the main LAG to either the second switch or the third switch if the destination MAC address is not associated with the first or second sub-LAG in the look-up table.

7. The information handling system of claim 4, wherein a packet without a destination MAC address in the lookup table is sent by the first switch over the main LAG.

8. The information handling system of claim 4, wherein the memory of the first switch further includes a plurality of hashing algorithms, including a source-MAC hashing algorithm, the hashing of which is determined by a source MAC address of packets received from a host having the source MAC address as its MAC address, the host being connected to the first switch such that the packets sent from the host with the source MAC address are hashed to one member port of the main LAG based on the source MAC address.

9. The information handling system of claim 4 wherein a unicast MAC address is associable with any of the first and second sub-LAGs to cause the first switch to forward packets based on the packets' destination MAC addresses such that if a packet is received on a port that is in the first or second sub-LAG and the packet is a flooding packet and/or the packet's destination MAC address is not associated with any port or LAG by the look-up table, then the packet is not forwarded over the main LAG.

10. The information handling system of claim 4 wherein the first sub-LAG consists of the first plurality of ports, and the second sub-LAG consists of the second plurality of ports.

* * * * *